(12) United States Patent
Grissom et al.

(10) Patent No.: US 7,600,380 B2
(45) Date of Patent: Oct. 13, 2009

(54) VALVE REGULATION FOR TURBOCHARGER

(75) Inventors: Thomas A. Grissom, Dexter, MI (US); Hartmut Claus, Rochester, MI (US)

(73) Assignee: BorgWarner Inc., Auburn Hills, MI (US)

( * ) Notice: Subject to any disclaimer, the term of this patent is extended or adjusted under 35 U.S.C. 154(b) by 111 days.

(21) Appl. No.: 11/125,959

(22) Filed: May 10, 2005

(65) Prior Publication Data

US 2006/0254273 A1 Nov. 16, 2006

(51) Int. Cl.
- F02B 33/44 (2006.01)
- F02B 37/013 (2006.01)
- F02B 37/00 (2006.01)
- F02B 37/12 (2006.01)
- F02B 37/18 (2006.01)

(52) U.S. Cl. .................................. 60/612; 137/625.44

(58) Field of Classification Search ............... 60/612; 137/630, 630.14, 630.19, 630.21, 630.22; F02B 37/013, F02B 37/00, 37/12, 37/18; F02D 23/00
See application file for complete search history.

(56) References Cited

U.S. PATENT DOCUMENTS

| | | | | |
|---|---|---|---|---|
| 260,490 | A * | 7/1882 | Martin et al. | 137/625.44 |
| 2,035,747 | A * | 3/1936 | Harris | 137/625.44 |
| 3,270,775 | A * | 9/1966 | Alderson | 137/625.44 |
| 3,521,659 | A * | 7/1970 | Seger | 251/298 |
| 4,718,457 | A * | 1/1988 | Luger | 251/298 |
| 5,908,047 | A * | 6/1999 | Nakamura et al. | 137/625.44 |
| 6,029,444 | A * | 2/2000 | Nakamura et al. | 60/324 |
| 6,311,493 | B1 | 11/2001 | Kurihara et al. | 60/612 |
| 6,694,736 | B2 | 2/2004 | Pfluger | 60/612 |
| 2005/0086936 | A1 | 4/2005 | Bucknell et al. | 60/602 |
| 2005/0263732 | A1* | 12/2005 | Kurian et al. | 251/298 |
| 2006/0042246 | A1 | 3/2006 | Gray, Jr. et al. | 60/612 |
| 2007/0074513 | A1* | 4/2007 | Lamb et al. | 60/612 |

FOREIGN PATENT DOCUMENTS

| | | | |
|---|---|---|---|
| DE | 43 31 943 A1 | | 3/1995 |
| DE | 19514572 A1 | * | 10/1996 |
| DE | 102 22 919 A1 | | 12/2003 |
| JP | 03 117624 A | | 5/1991 |
| JP | 07224633 A | * | 8/1995 |
| JP | 10121996 A | * | 5/1998 |
| JP | 2001280147 A | * | 10/2001 |
| WO | WO 2005019618 A1 | * | 3/2005 |

OTHER PUBLICATIONS

A Translation Steirmann (Pub. No. DE 102 22 919 A1).*

* cited by examiner

Primary Examiner—Thai Ba Trieu
(74) Attorney, Agent, or Firm—Warn Partners, P.C.

(57) ABSTRACT

The present invention provides a two-stage turbocharger unit having a valve that will help to create a smooth transition of exhaust gas energy from the high-pressure turbine (HP) turbine to the low-pressure (LP) turbine. The LP and HP turbines are positioned such that the valve can be in one position to force all of the exhaust gas to flow through the HP turbine and when in another position to force all of the exhaust gas through the LP turbine. When the valve is placed in an intermediate position, the exhaust gas can be variably directed to flow through both turbines, with the percentage of exhaust gas flowing through each turbine being dependent on the position of the valve.

25 Claims, 5 Drawing Sheets

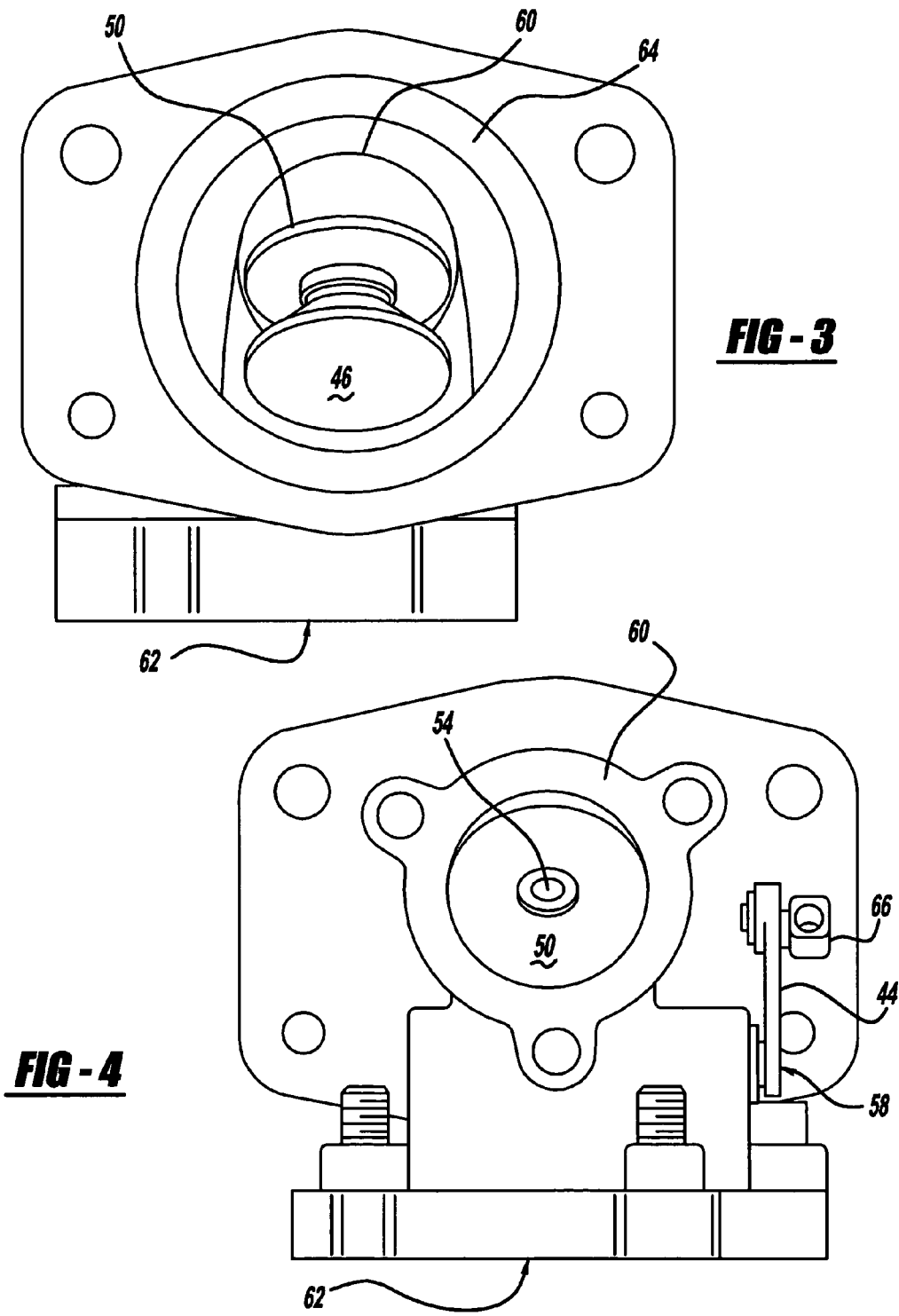

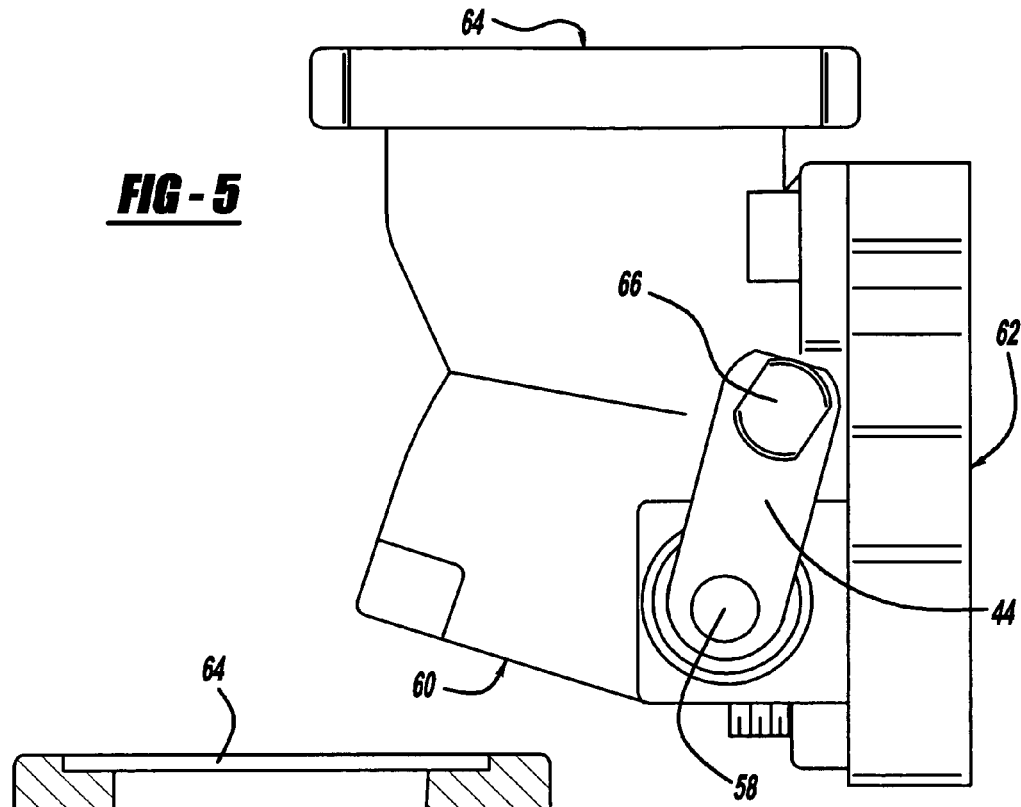
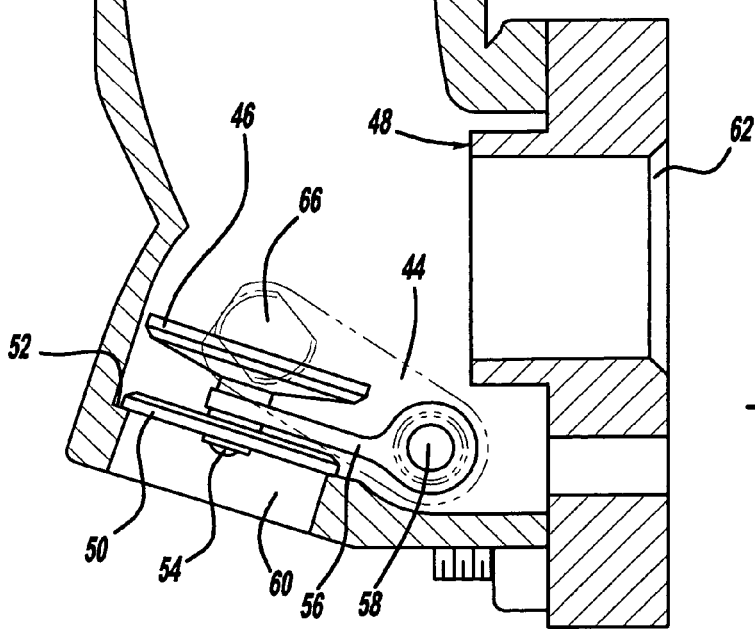

VALVE REGULATION FOR TURBOCHARGER

FIELD OF THE INVENTION

The present invention relates to the use of control valves in a two-stage turbocharger, more specifically, the regulation of controlling the transition from a high-pressure turbine to a low-pressure turbine.

BACKGROUND OF THE INVENTION

Two-stage turbochargers are commonly known and are used in all kinds of engines. They consist of a high-pressure (HP) turbine, and a low-pressure (LP) turbine, with each turbine having its own compressor. During normal operating conditions, when the engine runs at lower speeds, the only turbine typically in use is the HP turbine. When the engine is running at lower speeds, it creates less exhaust gas energy. This lower amount of exhaust gas energy is typically not enough to power the LP turbine, but it does provide enough energy to power the HP turbine. During operation, as the engine begins to increase speed, the HP turbine is typically operated by the lower energy exhaust gases, but after the engine reaches a certain speed and load, the HP turbine begins to operate in series with the LP turbine until the HP turbine provides enough flow capacity to have any effect on engine performance. When this occurs, the LP turbine begins to operate and generate the higher level of boost pressure than the HP turbine cannot generate in series with the LP turbine. Increasing engine speed also increases the exhaust gas energy, which is necessary to operate the LP turbine.

Another common problem with two-stage turbochargers occurs at higher engine speed, when the HP turbine is not cut off from the air flow of the exhaust gas. During this condition there is the possibility of "overspeed," i.e., the increased exhaust gas energy can cause the HP turbine to spin at speeds which may cause damage. Control valves of two-stage series turbocharger systems have been applied to modulate the amount of exhaust gas pressure flowing into the LP turbine. These valves typically have been used for closing off exhaust gas flow to the LP turbine thereby only allowing the exhaust gas to flow only to the HP turbine until the HP turbine is no longer effective, at which point the valve opens a pathway to allow exhaust to flow to the LP turbine. This is beneficial in providing boost pressure at low engine speeds, but does not aid preventing overspeed of the HP turbine.

Accordingly, there exists a need for an improvement in transitioning from the HP turbine to the LP turbine in a two-stage turbocharger system, as well as an improvement in the prevention in overspeed in a HP turbine.

SUMMARY OF THE INVENTION

Accordingly, it is an object of the present invention to provide a valve regulation assembly for a two-stage turbocharger which provides a smooth transition for exhaust gas flow from a HP turbine to a LP turbine during acceleration.

It is another object of the present invention to prevent overspeed in a HP turbine by directing all of the exhaust gas flow directly to the LP turbine, by using the present invention.

The present invention is an addition to the two-stage turbine concept, including a valve that allows for the closure of the high-pressure stage outlet to avoid high-pressure stage overspeed and also improves control characteristics.

According to the present invention, the LP and HP turbines are positioned such that the valve can be in one position to force all of the exhaust gas to flow through the HP turbine, and when in another position to force all of the exhaust gas through the LP turbine. When the valve is placed in an intermediate position, the exhaust gas can be variably directed to flow through both turbines, with the percentage of exhaust gas flowing through each turbine being dependent on the position of the valve.

The present invention also overcomes the problem of overspeed. The present invention can close off the flow of exhaust gas energy to the HP turbine, thereby eliminating the chance for overspeed to occur.

In accordance with a first embodiment of the present invention, a valve regulation assembly for a two-stage turbocharger is provided, comprising: (1) a high-pressure turbocharger unit having a high-pressure turbine portion operable to receive an exhaust gas flow; (2) a low-pressure turbocharger unit having a low-pressure turbine portion, and located downstream from said high-pressure turbocharger unit; and (3) a valve operably associated with said turbine portions of said high-pressure and said low-pressure turbocharger units, wherein said valve can direct said exhaust gas flow from a source of said exhaust gas flow to either said high-pressure turbocharger unit, said low-pressure turbocharger unit, or distribute said exhaust gas flow therebetween.

In accordance with a second embodiment of the present invention, a two-stage turbocharger for use in a motor vehicle is provided, comprising: (1) an exhaust conduit; (2) a high-pressure (HP) turbocharger unit operably associated with said exhaust conduit and operable to receive an exhaust gas flow; (3) a low-pressure (LP) turbocharger unit connected to said exhaust gas conduit and is located downstream of said high-pressure turbine; and (4) a valve located operably associated with said high-pressure turbine through said exhaust gas conduit, wherein said valve can be in a position to restrict all of said exhaust gas flow through said high-pressure turbine only, or said valve can be moved to another position to inhibit said exhaust gas flow from entering the high-pressure turbine, thereby directing all of said exhaust gas to flow to said low-pressure turbine.

In accordance with a third embodiment of the present invention, a method for directing exhaust gas flow in a two-stage turbocharger for use in a motor vehicle is provided, comprised of: (1) providing a high-pressure turbine; (2) providing a low-pressure turbine located downstream from said high-pressure turbine; (3) providing a conduit for exhaust gas flow from said high-pressure turbine to said low-pressure turbine; and (4) providing a valve located in said conduit, wherein said valve is used for directing exhaust gas flow from said high-pressure turbine to said low-pressure turbine.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a top view of the valve assembly portion of the present invention;

FIG. 4 is a bottom view of the valve assembly portion of the present invention;

FIG. 5 is a side view of the valve assembly portion of the present invention;

FIG. 6 is a cut-away side view of the valve assembly portion of the present invention with the valve in a position to block off the exhaust gas inlet port;

DETAILED DESCRIPTION OF THE PREFERRED EMBODIMENTS

The following description of the preferred embodiment(s) is merely exemplary in nature and is in no way intended to limit the invention, its application, or uses.

Figure 1:
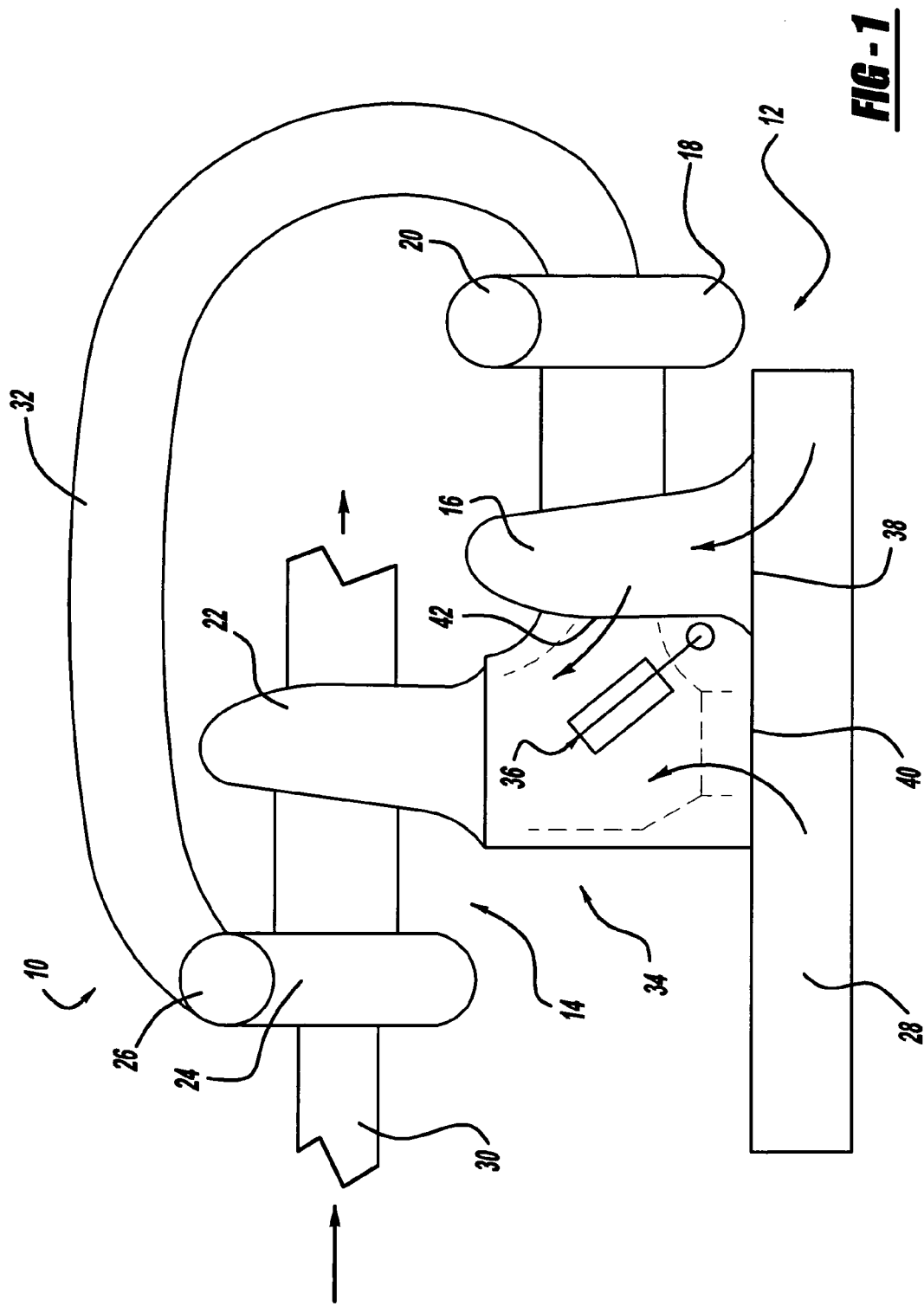
FIG. 1 is a schematic view of a two-stage turbocharger unit having the present invention used in an engine with one exhaust bank.

Referring to FIG. 1, a two-stage exhaust gas turbocharger unit is generally shown at 10, comprised of a high-pressure (HP) turbocharger unit 12, and a low-pressure (LP) turbocharger unit 14. The HP turbocharger unit 12 includes a HP turbine 16, and an HP compressor 18 having an outlet port 20. Similarly, the LP turbocharger unit 14 includes a LP turbine 22 and a LP compressor 24 having an outlet port 26. The LP turbine 22 is mounted on an exhaust manifold 28. The LP compressor 24 is connected to an intake line 30, which is connected at the center of LP compressor 24. An intake conduit 32 is connected to outlet port 26 on a first end, and is connected to the center of HP turbine 18 on a second end.

The HP turbine 16 and the LP turbine 22 are connected by a valve assembly 34 having a valve 36, shown in FIG. 1, and in FIGS. 3-8. The valve assembly 34 is mounted on the exhaust manifold 28 and receives exhaust gases from either the second exhaust manifold outlet 40 or the HP turbine outlet 42. The valve assembly 34 is also comprised of a lever 44, a first valve plate 46 that works in conjunction with a first contact surface 48, and second valve plate 50 that works in conjunction with a second contact surface 52. The first valve plate 46 and the second valve plate 50 face in opposite directions of each other, and are connected by a pin 54, and are mounted onto a valve stem 56. The valve stem 56 is fixed for rotation upon a hinge assembly 58. The valve assembly 34 also includes an exhaust gas inlet port 60, an HP turbine inlet port 62, an LP turbine outlet port 64, and a rotatable connector 66. The rotatable connector 66 is connected to an actuator (not shown) which can be hydraulic, pneumatic, or some other type of device controlled by the vehicle's electronic control unit.

The operation of the present invention configured for a single-bank exhaust system as shown in FIG. 1 will now be described. During low engine speed operation, the valve 36 is used to close off the exhaust gas inlet port 60 when the vehicle is first beginning to accelerate, and exhaust gas pressure is low, forcing all of the exhaust gas through the HP turbine 16. When the valve 36 is configured in this manner, the exhaust gas flows from the exhaust manifold 28, through the first exhaust manifold outlet 38, through the HP turbine 16, through the HP turbine outlet 42, through the HP turbine inlet port 62 and into the valve assembly 34. The valve assembly 34 then directs the exhaust gas into the LP turbine 22, where it is then passed into the remaining components of the exhaust system (not shown). As all of the exhaust gas is being forced through the HP turbine 16, fresh air flows through the intake line 30, passing through the LP compressor 24, and through outlet port 26. The air then flows through the intake conduit 32, and into the HP compressor 18. The HP compressor 18 compresses the fresh air received from the intake conduit 32, and forces it into the intake manifold of the engine (not shown).

During the process where all of the exhaust gas is being directed toward the HP turbine, the LP compressor 24 is not activated because it is controlled by the LP turbine 22, which is also not activated. The LP turbine 22 is larger in size compared to the HP turbine 16, and the LP compressor 24 is larger than the HP compressor 18. Neither are activated during this process because at lower engine speeds the volume of exhaust gas flow is not high enough to activate the LP turbine 22, and the volume of fresh air flowing into the system is not high enough for LP compressor 24 to effectively compress it. Directing all of the exhaust gas flow into the smaller HP turbine 16 allows the HP compressor 18 to provide the necessary amount of compressed air to flow into the intake manifold of the engine, increasing engine power at low engine speeds.

As the engine speed increases and the vehicle accelerates, the smaller HP turbine 16 and HP compressor 18 become less and less effective. When the engine speed increases to a certain predetermined value, the vehicle's electronic control unit commands the actuator (not shown) to open the valve 36, lifting the second valve plate 50 away from the second contact surface 52, allowing exhaust gas from the exhaust manifold 28 to flow through the second exhaust manifold outlet 40, through the exhaust gas inlet port 60, and then through the valve assembly 34. The exhaust gas then exits through the LP turbine outlet port 64 and flows into the LP turbine 22, the exhaust gas then flows into the remaining exhaust system components. As the LP turbine 22 is activated from the increased exhaust gas pressure, the LP compressor 24 will begin to compress air coming in from the intake line 30. The compressed air is then forced through the outlet port 26 and into the intake conduit 32, where it then flows through the HP compressor 18, through the outlet port 20, and into the intake manifold of the engine. During this portion of operation, the air coming into the HP compressor 18 has already been pressurized by the LP compressor 24, and the LP compressor 24 does not compress the air any further.

As the engine speed continues to increase, the valve 36 continues to rotate further away from the exhaust gas inlet port 60, and moves closer to the HP turbine inlet port 62. When it becomes necessary to direct all of the exhaust gas to flow directly into the LP turbine 22, the valve 36 moves into a position where the first valve plate 46 comes in contact with the first contact surface 48. When the valve 36 is in this position, exhaust gas cannot flow from the HP turbine 16 into the valve assembly 34. All of the exhaust gas flows from the exhaust manifold 28, through the second exhaust manifold outlet 40, and into the valve assembly 34. The valve 36 can be controlled by an actuator, or some other device, connected to the rotatable connector 66, which rotates the lever 44, thereby rotating the valve 36.

When closing off the second exhaust manifold outlet 40 or the HP turbine outlet 42, the valve 36 provides a smooth transition from the exhaust gas flowing through the HP turbine 16 to the LP turbine 22, and can be moved to any position therebetween to direct the flow of exhaust gas as driving conditions mandate.

It should also be noted that another advantage of the present invention is the orientation of the valve assembly 34 in relation to the HP turbine 16 and the LP turbine 22. The valve 36 is located in a position where the flow of exhaust gas pushes on the valve 36 when the first valve plate 46 is pressed against the first contact surface 48 and when the second valve plate 50 is pressed against the second contact surface 52. This also occurs when the valve 36 is located in any position therebetween. Also, the hinge assembly 58 is located in a position between the HP turbine outlet 42, and the second exhaust manifold outlet 40. Locating the hinge assembly 58 in this position allows for a single valve to be used for directing exhaust gas flow to either the HP turbine 16 or the LP turbine 22. Also, the valve assembly 34 is not only used for directing exhaust gas flow to each of the turbines, but the valve assembly 34 can also stop the flow of exhaust gas into the HP turbine 16, preventing overspeed and damage. Additionally, locating the valve 36 in the aforementioned position allows for greater control of the exhaust gas flow than compared to, for example, if the valve 36 were positioned in front of the second exhaust manifold outlet 40 or in front of the HP turbine outlet 42.

Figure 2:
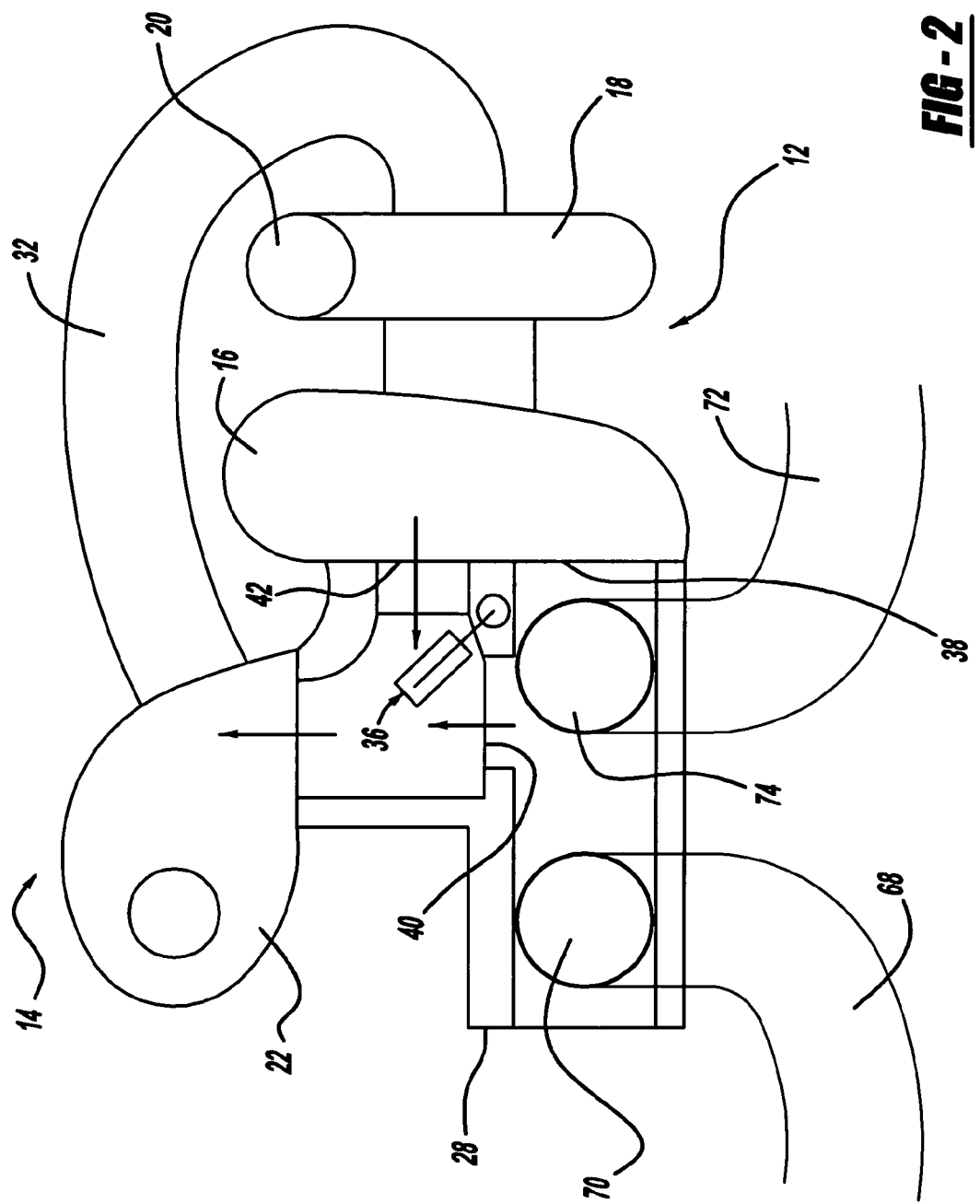
FIG. 2 is a schematic view of a two-stage turbocharger unit having the present invention used in an engine with two exhaust banks.
Figure 7:
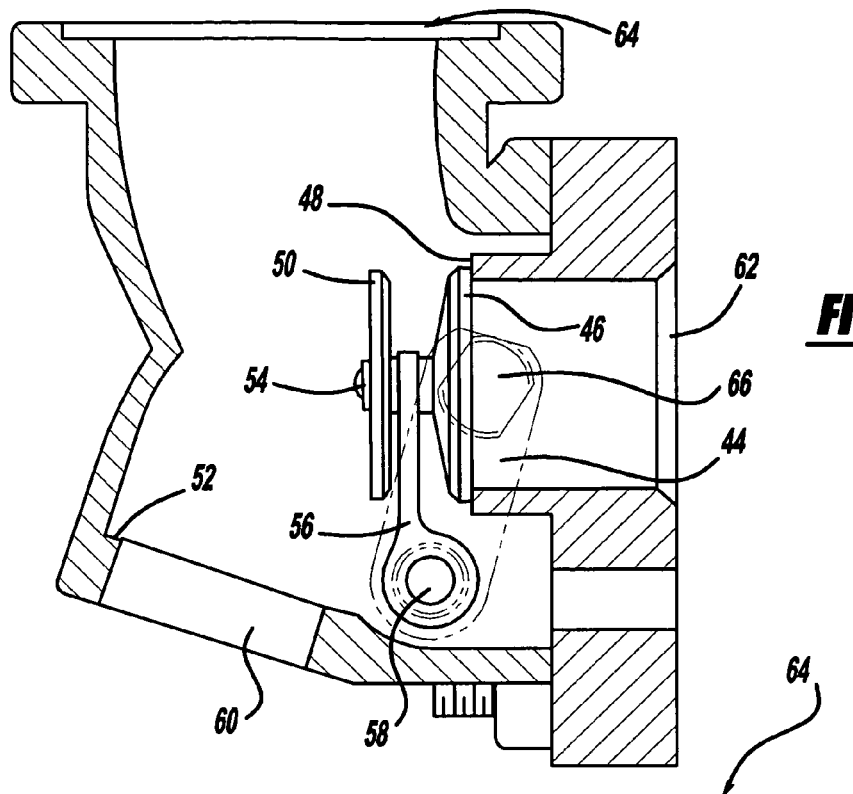
FIG. 7 is a cut-away side view of the valve assembly portion of the present invention with the valve in a position to block off the HP turbine inlet port.
Figure 8:
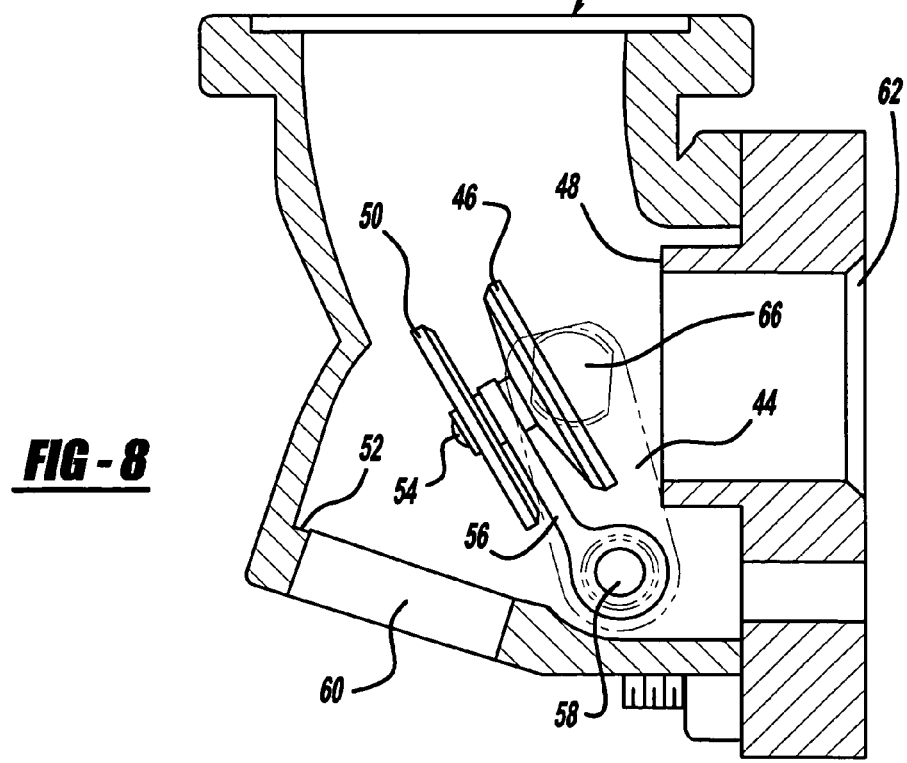
FIG. 8 is a cut-away side view of the valve assembly portion of the present invention with the valve in an intermediate position.

The present invention can also be used with engines having two exhaust banks, such as with a "V-6" or "V-8" engine. This embodiment is shown in FIG. 2, and is similar to the embodiment shown in FIG. 1, wherein like numbers refer to like elements. In addition, this embodiment also includes a first exhaust tube 68 connected to a first exhaust bank (not shown) and a first opening 70, as well as a second exhaust tube 72 connected to a second exhaust bank (not shown) and a second opening 74. In this embodiment, exhaust gas flows from the first exhaust tube 68 into the first opening 70, and from the second exhaust tube 72 into the second opening 74. The exhaust gas then flows into the exhaust manifold 28 where it is directed to flow into either the HP turbine 16 or the LP turbine 22 through the use of the valve assembly 34. The remaining operations of the HP turbocharger unit 12, the LP turbocharger unit 14 and the valve assembly 34 remain the same as mentioned in the previous embodiment.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for directing exhaust gas flow in a two-stage turbocharger for use in a motor vehicle, comprising the steps of:

providing a high-pressure turbine;
providing at least one outlet formed as a portion of said high-pressure turbine;
providing a low-pressure turbine located downstream from said high-pressure turbine;
providing an exhaust manifold;
providing a first exhaust gas outlet in said exhaust manifold, said first exhaust gas outlet in fluid communication with said high-pressure turbine;
providing a second exhaust gas outlet in said exhaust manifold;
providing a valve assembly in fluid communication with said exhaust manifold through said second exhaust gas outlet of said exhaust manifold, with said high-pressure turbine, and said low-pressure turbine;
providing a valve stem in said valve assembly, said valve stem being operable with a hinge assembly to be pivotable within said valve assembly, and wherein said valve assembly is operably connected to an actuator that selectively moves said hinge assembly and said valve stem;
providing a first valve plate connected to said valve stem;
providing a second valve plate connected to said valve stem;
providing a pin extending through said valve stem, and connected to said first valve plate and said second valve plate;
providing an exhaust gas inlet port formed as a portion of said valve assembly, and in fluid communication with said second exhaust gas outlet of said exhaust manifold;
providing a high-pressure turbine inlet port formed as a portion of said valve assembly, and in fluid communication with said at least one outlet formed as a portion of said high-pressure turbine;
providing a first contact surface formed as part of said high-pressure turbine inlet port;
providing a second contact surface formed as part of said exhaust gas inlet port;
pivoting said valve stem in said valve assembly such that said first valve plate contacts said first contact surface and selectively blocks said high-pressure turbine inlet port, thereby directing exhaust gas flow from said exhaust manifold through said second exhaust gas outlet, through said exhaust gas inlet port, and through said low-pressure turbine outlet port, and into said low-pressure turbine; and
pivoting said valve stem in said valve assembly such that said second valve plate contacts said second contact surface and selectively blocks said exhaust gas inlet port, thereby directing exhaust gas flow from said exhaust manifold through said first exhaust gas outlet, through said high-pressure turbine, said at least one outlet of said high-pressure turbine, through said high-pressure turbine inlet port, and through said low-pressure turbine outlet port into said low-pressure turbine.

2. The method for directing exhaust gas in a two-stage turbocharger for use in a motor vehicle according to claim 1, further comprising the step of providing locating said valve in a position to pivot between said exhaust gas inlet port, and said high-pressure turbine inlet port, and any position therebetween.

3. The method for directing exhaust gas in a two-stage turbocharger for use in a motor vehicle according to claim 1, further comprising the steps of moving said first valve plate of said valve in a position to partially close off said high-pressure turbine inlet port, forcing substantially all of the exhaust gas to flow directly through said second exhaust gas outlet of said exhaust manifold, and into said valve assembly, and a portion of the exhaust gas will flow through said first exhaust gas outlet and into said high-pressure turbine.

4. The method for directing exhaust gas in a two-stage turbocharger for use in a motor vehicle according to claim 1, further comprising the step of moving said second valve plate of said valve in a position to partially close off said exhaust gas inlet port, forcing substantially all of the exhaust gas to flow directly into said high-pressure turbine prior to flowing through said valve assembly, and a portion of the exhaust gas flow from said exhaust manifold into said valve assembly.

5. The method for directing exhaust gas in a two-stage turbocharger for use in a motor vehicle according to claim 1, further comprising the step of controlling the position of said valve with said actuator.

6. The method for directing exhaust gas in a two-stage turbocharger for use in a motor vehicle according to claim 5, further comprising the step of selecting said actuator from the group consisting of an electric actuator, a hydraulic actuator, a pneumatic actuator, and combinations thereof.

7. A valve regulation assembly for a two-stage turbocharger in an internal combustion engine, comprising:

an exhaust manifold having at least one outlet;
a high-pressure turbocharger unit including a high-pressure turbine portion having at least one outlet, said high-pressure turbine portion operable to receive an exhaust gas flow from said exhaust manifold;
a low-pressure turbocharger unit having a low-pressure turbine portion, and located downstream from said high-pressure turbocharger unit, wherein said low-pressure turbine portion selectively receives exhaust gas from either or both of said exhaust manifold or said high-pressure turbine portion;
a valve assembly having a high-pressure turbine inlet port operable for selectively receiving exhaust gas from said at least one outlet of said high-pressure turbine portion, and an exhaust gas inlet port operable for selectively receiving exhaust gas from said at least one outlet of said exhaust manifold; and
a valve having a first valve plate and a second valve plate connected to a valve stem, said valve being disposed within said valve assembly and said valve stem operable for being pivotable for positioning said second valve plate to selectively block said exhaust gas inlet port such that substantially all of said exhaust gas flowing from said exhaust manifold will flow from said exhaust manifold through said high-pressure turbine portion, said valve assembly, and through said low-pressure turbine portion, and for positioning said first valve plate to selectively block said high-pressure turbine inlet port such that substantially all of said exhaust gas flowing from said exhaust manifold will flow from said exhaust manifold through said valve assembly into said low-pressure turbine portion, wherein said valve assembly is operably connected to an actuator that selectively moves said valve stem.

8. The valve regulation assembly for a two-stage turbocharger in an internal combustion engine according to claim 7, said at least one outlet of said exhaust manifold further comprising:
a first exhaust gas outlet operable for delivering fluid to said high-pressure turbine portion; and
a second exhaust gas outlet operable for delivering fluid to said exhaust gas inlet port of said valve assembly.

9. The valve regulation assembly for a two-stage turbocharger in an internal combustion engine according to claim 7, further comprising said valve being positioned to selectively block said high-pressure turbine inlet port such that said exhaust gas flow does not pass through said high-pressure turbocharger unit, and the flow of said exhaust gas in said high-pressure turbine portion applying pressure to said valve.

10. The valve regulation assembly for a two-stage turbocharger in an internal combustion engine according to claim 7, further comprising said valve being movable to a position that selectively blocks said exhaust gas inlet port, forcing all of said exhaust gas flow through said high-pressure turbine portion of said high-pressure turbocharger unit, and the flow of said exhaust gas in said exhaust manifold applying pressure to said valve.

11. The valve regulation assembly for a two-stage turbocharger in an internal combustion engine according to claim 7, wherein said actuator is operably connected to said valve stem for moving said valve stem to a desired position, and said actuator is one selected from the group consisting of an electric actuator, a hydraulic actuator, a pneumatic actuator, and combinations thereof.

12. The valve regulation assembly for a two-stage turbocharger in an internal combustion engine according to claim 11, wherein said actuator manipulates said valve to direct exhaust gas flow to both said high-pressure turbocharger unit, and said low-pressure turbocharger unit.

13. The valve regulation assembly for a two-stage turbocharger according to claim 7, said valve assembly further comprising a low-pressure turbine outlet port operable for delivering said exhaust gas flow to said low-pressure turbine portion, and said exhaust gas flow is directed through said low-pressure turbine outlet port when said valve selectively blocks said exhaust gas inlet port or said high-pressure turbine inlet port.

14. A two-stage turbocharger for use in a motor vehicle, comprising:
an exhaust manifold;
at least one outlet formed in said exhaust manifold;
a high-pressure (HP) turbocharger unit operably associated with said exhaust manifold, and operable to receive an exhaust gas flow;
at least one outlet formed in said high-pressure turbocharger unit;
a low-pressure (LP) turbocharger unit connected to said exhaust manifold and is located downstream of said high-pressure turbocharger unit;
a valve assembly located operably associated with said high-pressure turbine through said at least one outlet formed in said exhaust gas manifold, said valve assembly including a high-pressure turbine inlet port, and an exhaust gas inlet port;
a valve disposed within said valve assembly, said valve further comprised of a first valve plate operable for selectively blocking said high-pressure turbine inlet port, and a second valve plate operable for selectively blocking said exhaust gas inlet port, with said first valve plate and said second valve plate connected to a valve stem, said valve stem operable with a hinge assembly for being pivotable within said valve assembly, wherein said valve is positioned such that said second valve plate selectively blocks exhaust gas flow through said exhaust gas inlet port such that substantially all of said exhaust gas flowing from said exhaust manifold will flow from said exhaust manifold through said high-pressure turbine portion, said valve assembly, and through said low-pressure turbine portion, and said valve is positioned such that said first valve plate selectively blocks said high-pressure turbine inlet port such that substantially all of said exhaust gas flowing from said exhaust manifold will flow from said exhaust manifold through said valve assembly into said low-pressure turbine portion to inhibit said exhaust gas flow from flowing through said high-pressure turbine, thereby directing all of said exhaust gas to flow to said low-pressure turbine, wherein said valve assembly is operably connected to an actuator that selectively moves said hinge assembly and said valve stem.

15. The two-stage turbocharger for use in a motor vehicle according to claim 14, said at least one outlet formed in said exhaust manifold further comprising:
a first exhaust gas outlet in fluid communication with said high-pressure turbocharger unit, wherein said high-pressure turbocharger unit is operably associated with said exhaust gas manifold; and
a second exhaust gas outlet in fluid communication with said exhaust gas inlet port of said valve assembly.

16. The two-stage turbocharger for use in a motor vehicle according to claim 15, wherein said exhaust gas inlet port of said valve assembly is in fluid communication with said second exhaust gas outlet of said exhaust manifold, and the flow of exhaust gases from said exhaust manifold bias said second valve plate of said valve away from said exhaust gas inlet port when said second valve plate is positioned to selectively block said exhaust gas inlet port.

17. The two-stage turbocharger for use in a motor vehicle according to claim 14, wherein said high-pressure turbine inlet port of said valve assembly is located on the output side of said high-pressure turbine, thereby allowing the flow of exhaust gases through said high-pressure turbine to bias said first valve plate of said valve away from said high-pressure turbine inlet port when said first valve plate is positioned to selectively block said high-pressure turbine inlet port.

18. The two-stage turbocharger for use in a motor vehicle according to claim 14, further comprising:
a lever;
said hinge assembly being connected to said lever and said valve stem;
said first valve plate and said second valve plate being mounted on said valve stem, wherein said first valve plate is substantially parallel to said second valve plate; and
said actuator is one selected from the group consisting of an electric actuator, a hydraulic actuator, a pneumatic actuator, and combinations thereof, wherein said actuator is operably connected to said lever, and said actuator pivots said lever and said valve stem about said hinge assembly such that said valve stem holds said first valve plate in position where said first valve plate selectively blocks said high-pressure turbine inlet port, thereby inhibiting any exhaust gas from flowing through said high-pressure turbine, or said actuator pivots said lever and said valve stem about said hinge assembly such that said second valve plate selectively blocks said exhaust gas inlet port, forcing all exhaust gas through said high-pressure turbine prior to entering said valve assembly.

19. The two-stage turbocharger for use in a motor vehicle according to claim 18, wherein said actuator operably pivots said lever and said valve stem of said valve about said hinge assembly such that said first valve plate allows exhaust gas flow through said high-pressure turbine inlet port and said second valve plate allows exhaust gas flow through said exhaust gas inlet port, thereby distributing the flow of exhaust gases through both said high-pressure turbine and said valve assembly simultaneously.

20. The valve regulation assembly for a two-stage turbocharger according to claim 14, said valve assembly further comprising a low-pressure turbine outlet port for receiving exhaust gas flow from either or both of said high-pressure turbine inlet port of said valve assembly, or said exhaust gas inlet port of said valve assembly.

21. A valve regulation assembly for a two-stage turbocharger in an internal combustion engine, comprising:
a high-pressure turbocharger unit having a high-pressure turbine portion operable to receive an exhaust gas flow from an exhaust manifold;
at least one outlet formed in said exhaust manifold;
at least one high-pressure turbine outlet formed as a portion of said high-pressure turbine portion;
a low-pressure turbocharger unit having a low-pressure turbine portion, located downstream from said high-pressure turbocharger unit;
a valve assembly having an exhaust gas inlet port operable for receiving said exhaust gas flow from said at least one outlet formed in said exhaust manifold, said valve assembly also having a high-pressure turbine inlet port operable for receiving said exhaust gas flow from said at least one high-pressure turbine outlet formed as a portion of said high-pressure turbine portion;
a valve stem operable with a hinge assembly and being pivotally disposed within said valve assembly;
a first contact surface formed as part of said high-pressure turbine inlet port;
a second contact surface formed as part of said exhaust gas inlet port;
a first valve plate mounted on said valve stem, said first valve plate operable for being positioned to contact said first contact surface;
a second valve plate mounted on said valve stem substantially parallel to said first valve plate and said second valve plate being operable to be positioned to contact said second contact surface, wherein said valve stem is pivotable to position said first valve plate to contact said first contact surface and selectively block said high-pressure turbine inlet port such that substantially all of said exhaust gas flowing from said exhaust manifold will flow from said exhaust manifold through said valve assembly into said low-pressure turbine portion, and said valve stem is pivotable to position said second valve plate to contact said second contact surface and selectively block said exhaust gas inlet port such that substantially all of said exhaust gas flowing from said exhaust manifold will flow from said exhaust manifold through said high-pressure turbine portion, said valve assembly, and through said low-pressure turbine portion, wherein said valve assembly is operably connected to an actuator that selectively moves said valve stem to pivot about said hinge assembly; and
a pin extending through said valve stem, and connected to said first valve plate and said second valve plate.

22. The valve regulation assembly for a two-stage turbocharger in an internal combustion engine of claim 21, said at least one outlet formed in said exhaust manifold further comprising:
a first exhaust manifold outlet in fluid communication with said high-pressure turbine portion, said first exhaust manifold outlet allowing said exhaust gas flow to be selectively directed from said exhaust manifold to said high-pressure turbine portion when said second valve plate selectively blocks said exhaust gas inlet port; and
a second exhaust manifold outlet in fluid communication with said valve assembly, said second exhaust manifold outlet allowing said exhaust gas flow to be selectively directed from said exhaust manifold directly into said valve assembly when said first valve plate selectively blocks said high-pressure turbine inlet port.

23. The valve regulation assembly for a two-stage turbocharger in an internal combustion engine of claim 21, wherein said high-pressure turbine outlet is in fluid communication with said high-pressure turbine inlet port such that when said valve assembly selectively blocks said high-pressure turbine outlet, all of said exhaust gas flow will pass from said exhaust manifold through said valve assembly and into said low-pressure turbine portion.

24. The valve regulation assembly for a two-stage turbocharger in an internal combustion engine of claim 21, further comprising said valve is positioned to partially or completely block either of said exhaust gas inlet port or said high-pressure turbine inlet port.

25. The valve regulation assembly for a two-stage turbocharger in an internal combustion engine of claim 21, further comprising:
a low-pressure turbine outlet port, and said valve stem, said first valve plate, and said second valve plate are used to deliver said exhaust gas flow from either of said exhaust gas inlet port or said high-pressure turbine inlet port to said low-pressure turbine outlet port.

* * * * *